Aug. 28, 1951     J. R. BRINKLEY     2,565,800
HARVESTER FOR LADINO CLOVER SEED
Filed Oct. 24, 1949     4 Sheets-Sheet 1

INVENTOR.
JACK R. BRINKLEY
BY
Munn, Liddy & Glaccum
ATTORNEYS.

Aug. 28, 1951 J. R. BRINKLEY 2,565,800
HARVESTER FOR LADINO CLOVER SEED
Filed Oct. 24, 1949 4 Sheets-Sheet 2
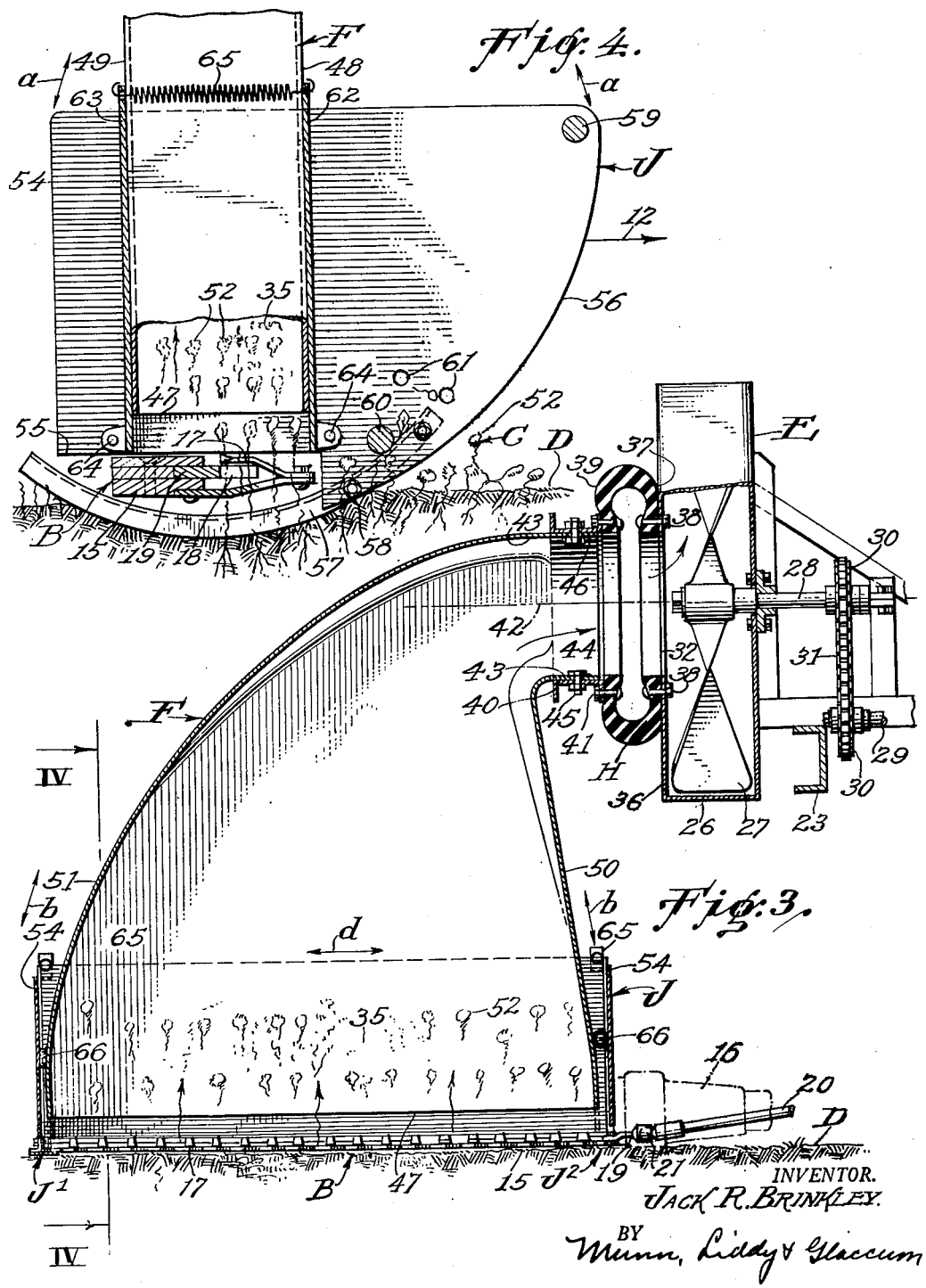
INVENTOR.
JACK R. BRINKLEY.
BY Munn, Liddy & Glaccum
ATTORNEYS.

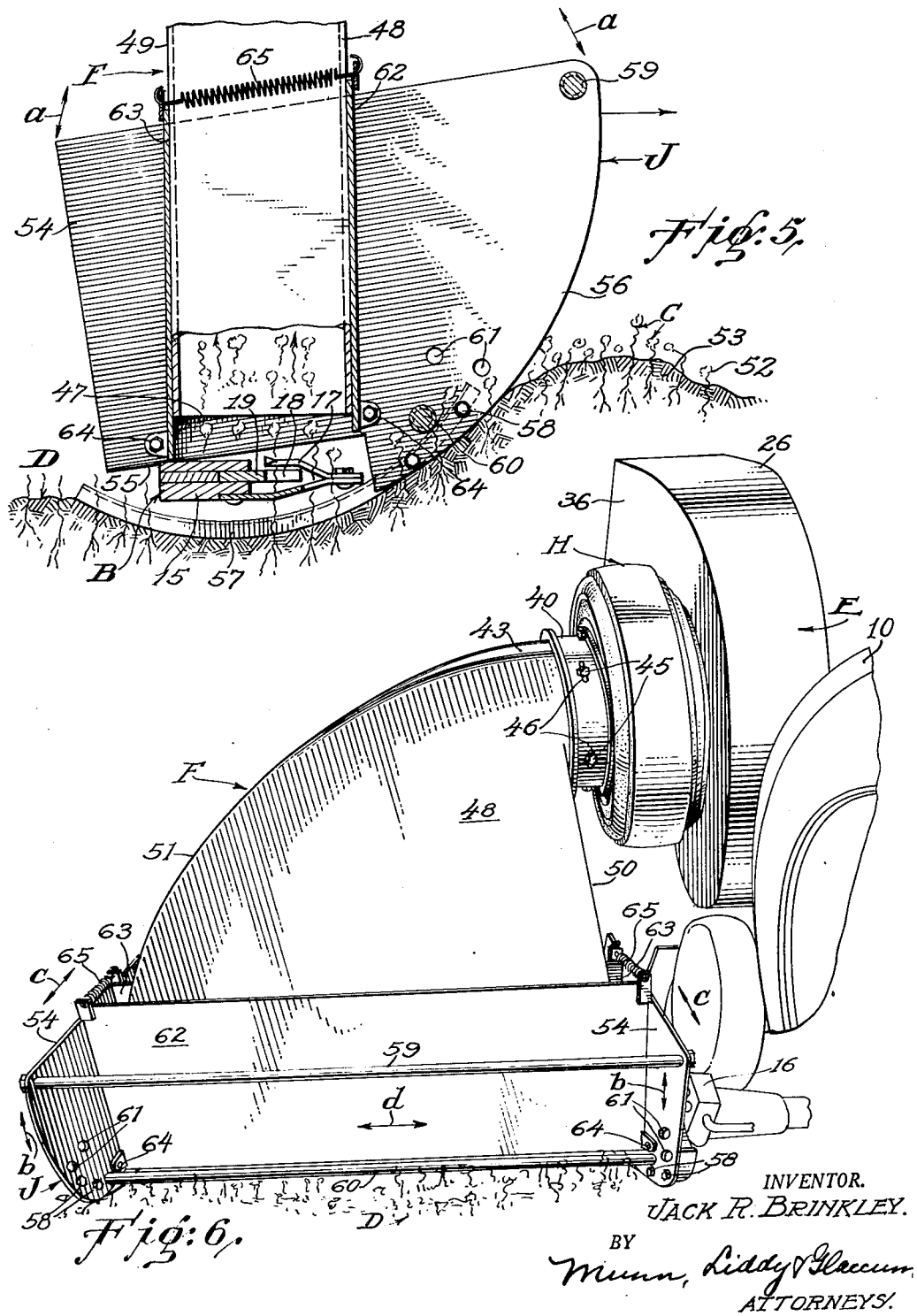

Aug. 28, 1951  J. R. BRINKLEY  2,565,800
HARVESTER FOR LADINO CLOVER SEED
Filed Oct. 24, 1949  4 Sheets-Sheet 4
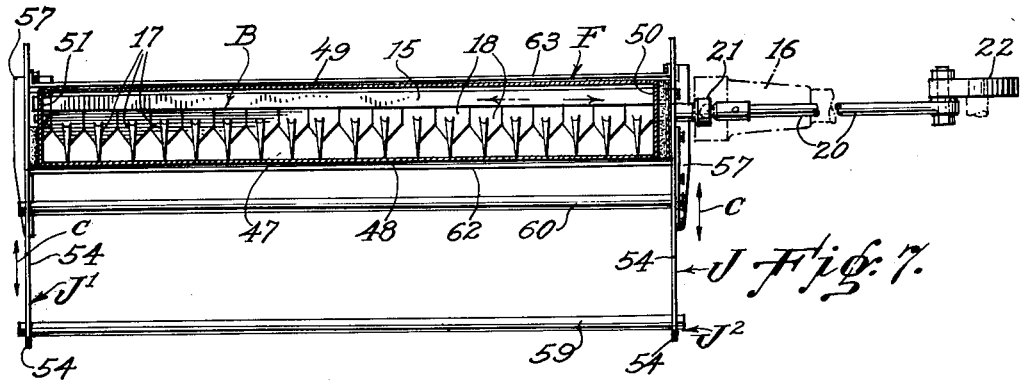
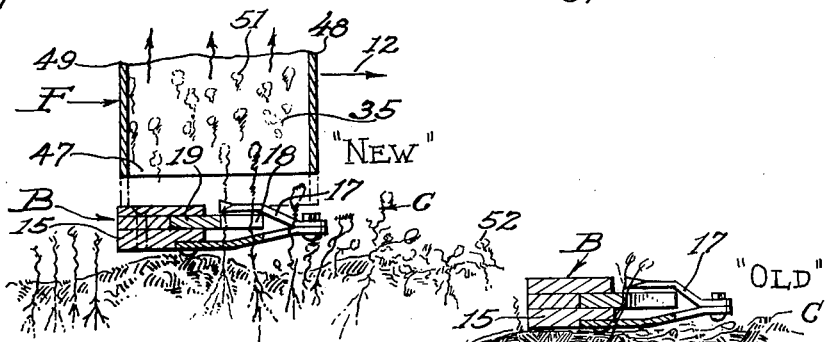
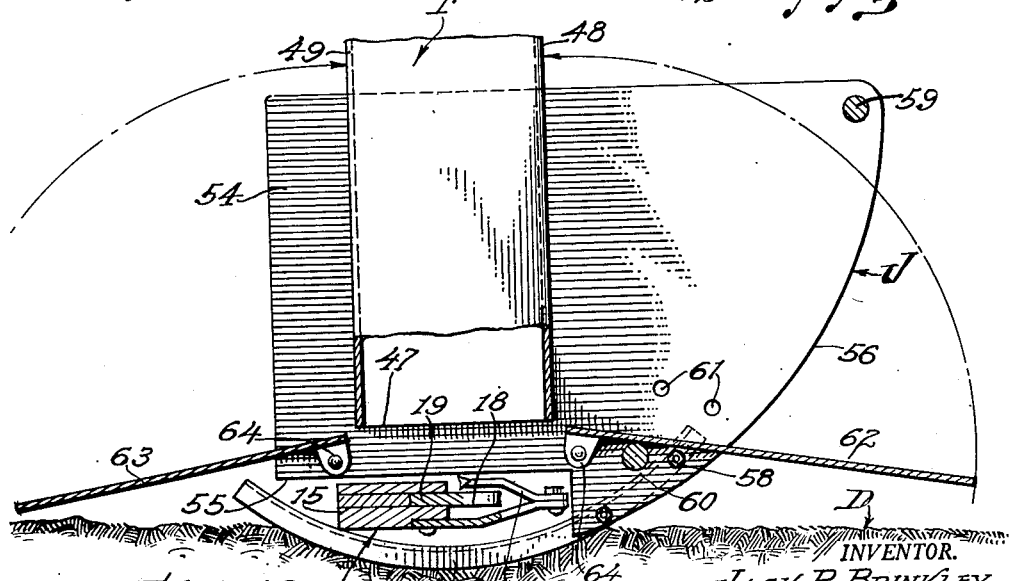
INVENTOR.
JACK R. BRINKLEY.
BY
ATTORNEYS.

Patented Aug. 28, 1951

2,565,800

UNITED STATES PATENT OFFICE 2,565,800

HARVESTER FOR LADINO CLOVER SEED

Jack R. Brinkley, Elk Grove, Calif.

Application October 24, 1949, Serial No. 123,166

9 Claims. (Cl. 56—158)

The present invention relates to improvements in a harvester for ladino clover. It consists of the combinations, constructions, and arrangement of parts, as hereinafter described and claimed.

It is well known in the farming and dairy industries that ladino clover is excellent forage for cattle. Although this crop may be grown in many sections of the country, the raising of ladino clover for its seed is rather restricted. Accordingly, the seed is quite expensive. Moreover, the ladino clover plants grow close to the ground, and spread thereover, making it difficult to harvest the seed on a good production scale.

In an endeavor to obtain a somewhat higher percentage of ladino clover seeds, farmers have resorted to advancing various types of harvesters over the same area of ground several times. However, this method is quite costly and time-consuming, and does not yield a very large percentage of the seed available on the plants. Further, these harvesters grind the clover plants into the ground, thereby losing many of the seeds. In these earlier attempts, considerable amount of dirt is mixed with the recovered seed.

Accordingly, I have constructed a harvester that is designed to recover substantially all of the ladino clover seed available in a field, while travelling only once over the area, without mixing dirt with the seed. Actual tests have demonstrated the practicability of my harvester.

Broadly speaking, I mount a mowing machine on a suitable traction device such as a tractor, so as to extend laterally therefrom, beyond the path taken by the tractor during its advance. This mowing machine includes the conventional reciprocating sickle or knife bar, which operates through guards to cut the ladino clover plants.

In combination with this mower machine, I provide a suction hood for applying suction in the immediate vicinity of the sickle bar to raise the plants into the space between the reciprocating knives and the guards. As my harvester advances, the clover seeds and blossoms are conveyed through the suction hood and are recovered therefrom.

Moreover, I provide a suction nozzle carriage that is adapted to ride over uneven contour of the ground. This carriage surrounds the sickle bar and has the suction hood extending thereinto. As a further object of the invention, I mount the suction hood and carriage so that they may yield in the event that an obstruction is encountered during the harvesting operation.

As a still further object, I provide a suction nozzle carriage which is adapted to be secured to or removed from the suction hood with facility and ease.

Other objects and advantages will appear as the specification continues. The novel features of my invention will be set forth in the claims hereunto appended.

Drawings

For a better understanding of my harvester, reference should be made to the accompanying drawings, forming part of this application, in which:

Figure 3 is a vertical sectional view taken through the suction hood and carriage along the line III—III of Figure 2, and on an enlarged scale;

Figure 4 is a sectional view taken along the line IV—IV of Figure 3, but on a still larger scale;

Figure 5 is a view similar to Figure 4, with the suction nozzle carriage tilted on its longitudinal axis relative to the suction hood due to striking an obstruction;

Figure 6 is a perspective view of the suction fan, hood and carriage that I employ;

Figure 7 is a horizontal sectional view taken along the line VII—VII of Figure 1 just above the suction nozzle carriage;

Figure 8 is a diagrammatic view, showing my "NEW" method of harvesting ladino clover by employing the suction hood adjacent to the sickle bar;

Figure 9 is a view similar to Figure 8, with the suction hood omitted, and disclosing the "OLD" method of harvesting the ladino clover; and Figure 10 is a view like Figure 4 but showing front and rear plates of the suction nozzle carriage lowered to the ground to permit the suction hood to be moved into a position overlying the sickle bar.

Detailed description

Figure 1:
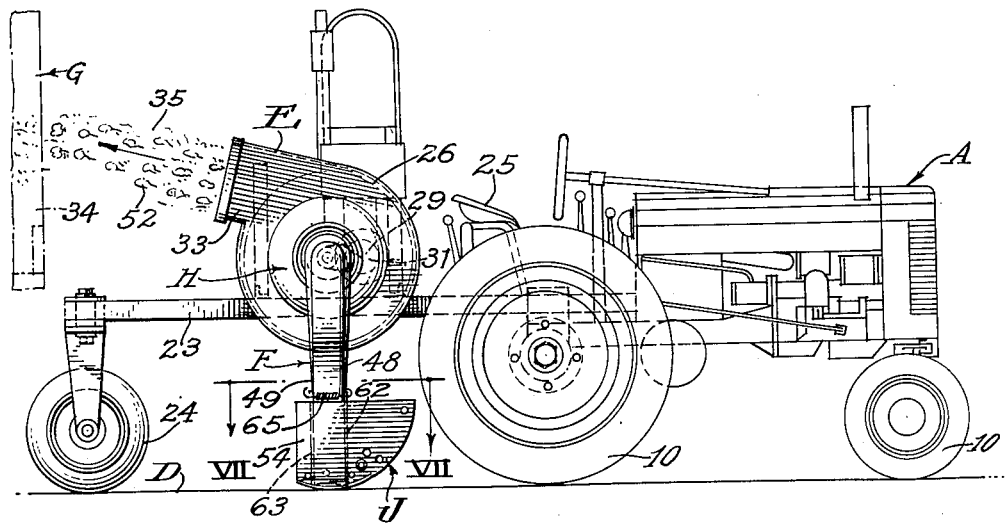
Figure 1 is a side elevation of a tractor having my harvester connected thereto.

Referring to the drawings, I have illustrated a suitable draft vehicle, such as a tractor indicated generally at A. This tractor is equipped with an integral mower B of conventional design, which extends laterally beyond the tractor, as clearly shown in Figure 2. In other words, the mower is arranged to one side of the path taken by the wheels 10 of the tractor. As the tractor advances, or turns, the mower moves therewith.

Figure 2:
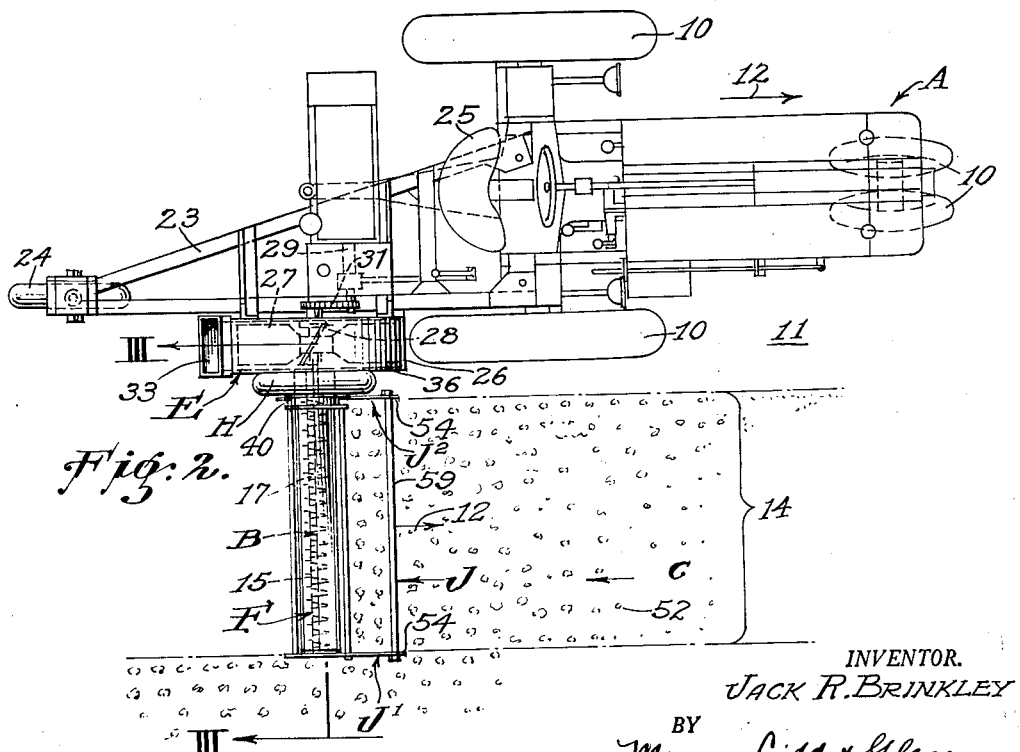
Figure 2 is a top plan view of the tractor and harvester.

It will be noted from Figure 2 that the mower B has cut at least one swath or course 11, and is advancing in the direction of the arrow 12 to cut another swath 14 of ladino clover C. The tractor is running over the previously-cut swath 11, while the mower is projecting into the swath 14 being cut during the advance of the tractor.

Any suitable mower may be employed. For this purpose I have disclosed a cutter bar or guide 15, which is supported by a frame 16 extending from the tractor. This bar has the usual guards 17 spaced therealong and projecting forwardly therefrom. The ladino clover enters the spaces between these guards as the mower advances, and is cut by knives 18 on a reciprocating sickle 19 mounted in the cutter bar or guide.

The sickle 19 is driven by a pitman 20, which is connected to the pitman by a universal joint 21 (see Figures 3 and 7). In turn, the pitman is operated by an eccentric 22. Only the main parts of the mower have been illustrated, since the particular type of mower is not important. It may be mentioned, however that a safety spring release (not shown) is provided to permit the entire mower to swing back out of the way in the event that the cutter bar should strike a field obstruction.

The tractor A has a chassis frame 23 secured thereto so as to extend rearwardly therefrom. The rear portion of this chassis frame is supported on a caster wheel 24 that rides over the surface of the ground D. As disclosed in Figures 1–3, a centrifugal blower or fan E is mounted on the chassis frame rearwardly of the driver's seat 25 on the tractor.

The blower E is conventional, and includes a housing 26 having an impeller 27 rotatably mounted thereon. In Figures 2 and 3, I show the impeller shaft 28 being operatively connected to a drive shaft 29 by sprockets 30 and a chain 31. The axial intake opening 32 communicates with a suction hood F (see Figure 3), while the tangential outlet 33 is directed rearwardly toward the open front 34 of a trailer indicated generally at G, as suggested in Figure 1. As the specification continues, it will be made clear that the ladino clover seed 35 are drawn upwardly through the suction hood F from the cutter bar, pass through the intake opening 32 of the blower, and are discharged from the outlet 33 directly into the trailer.

Next, I shall describe the structural features of the suction hood F and the manner in which it is mounted. An ordinary rubber tire H is abutted against the wall 36 of the blower so as to extend around the intake opening 32 fashioned in this wall. The side 37 of this tire is secured to the wall 36 by bolts 38 (see Figure 3), while the opposite side 39 of the tire has a rim 40 fastened thereto by bolts 41. It will be appreciated, of course, that the tire H is sufficiently resilient to permit the rim 40 to move slightly up and down; also, to allow the rim to turn slightly about its axis 42.

The suction hood F has a tubular outlet end 43, which is telescoped into the rim 40 (see Figures 3 and 6). Nuts 44 are welded to the interior of the outlet end 43 of the hood, and studs 45 pass through slots 46 provided in the rim and are threaded into the nuts 44. These studs and slots will permit a minor turning movement of the hood relative to the rim 40.

The lower inlet end or mouth 47 of the suction hood is disposed substantially horizontal in adjacent relation with the cutter bar 15, and has been shown as being rectangular in horizontal section (see Figure 7). The front and rear walls 48, and 49, respectively, of the hood are parallel with one another; and, normally, are arranged vertically. However, the inner and outer end walls 50 and 51, respectively, of the hood converge upwardly from the lower inlet end 47 to the upper outlet end 43 thereof.

It will be quite apparent from the drawings that the mouth end 47 opens toward the surface of the ground D and is positioned adjacent thereto. The seed-containing blossoms 52 of the ladino clover usually grow close to the ground, as suggested in Figures 8 and 9. Moreover, these clover plants tend to spread out over the ground rather than extend upwardly therefrom. The suction established in the hood F will raise these blossoms, as indicated in Figure 8, thus allowing the guards 17 and sickle knives 18 to cut the blossoms. The latter are drawn upwardly through the hood, together with any loose ladino clover seed 35, by the suction established in the blower E. These blossoms and seed are discharged directly into the trailer G, which is towed behind the tractor.

It will be appreciated, of course, that the contour of the ground D is not perfectly level, and often is interrupted by irrigation checks or ridges 53 (see Figure 5). In order to compensate for this uneven surface of the ground, and still apply the suction to the cutter bar 15, I provide a suction nozzle carriage J. As illustrated in the drawings, this carriage surrounds the lower end of the suction hood F and telescopes therewith.

The suction nozzle carriage J is designed to ride along the surface of the ground, and is free to bob up and down or to tilt relative to the suction hood F. This carriage includes a pair of upright end shields or plates 54, which are mounted in parallel relation with one another. These plates serve as "dividers" between the swaths of clover being cut.

These end plates have notches 55 in their underneath surfaces so as to receive the cutter bar 15, guards 17 and the sickle 19 with its knives 18 (see Figures 4, 5 and 10). The leading edges 56 of the plates 54 curve upwardly and forwardly to provide runners that will glide over field obstructions. Shoes 57 are removably attached by bolts 58, or the like, to the plates 54 and form continuations of the curved edges 56. The shoes 57 extend rearwardly underneath the cutter bar 15. Sufficient space is provided by the notches 55 to allow the plates to tilt into various angular positions relative to the cutter bar, as suggested in Figure 5.

It will be noted that the end plates 54 are interconnected by cross-rods or ties 59 and 60, which are disposed forwardly of the suction hood F. The rod 60 serves the additional function of bending over exceptionally high clover or weeds, and presenting them to the cutting action of the mower. Several openings 61 are provided in these end plates to allow the cross-rod 60 to be secured to the plates at different locations.

Moreover, the carriage J includes front and rear plates 62 and 63, respectively, which extend between the end plates 54. The plates 62 and 63 are disposed on opposite sides of the suction hood F and have their lower portions hinged at 64 to the end plates 54. Tension springs 65 interconnect the upper portions of the front and rear plates 62 and 63, respectively, and draw them against the front and rear walls 48 and 49, respectively, of the suction hood F. However, these springs will yield and allow the suction nozzle carriage J to tilt about its longitudinal axis (compare Figures 4 and 5).

Referring to Figure 3, I have disclosed resilient sealing members 66 interposed between the end plates 54 of the carriage J and the inner and outer walls 50 and 51, respectively, of the suction hood. These members will permit the carriage J to move up and down relative to the suction hood F, or to tilt into angular relationship therewith, without breaking the seal therebetween. Furthermore, the outboard and inboard ends J1 and J2, respectively, of the carriage may rise or fall independently of each other due to uneven surface of the ground (see Figure 3).

In applying the suction nozzle carriage J over the cutter bar 15 and the lower portion of the suction hood F, the springs 65 are disengaged from the plates 62 and 63. Thereafter, these plates are swung downwardly toward or against the ground D, as shown in Figure 10. The shoes 57 may be removed to allow the mower B to be advanced into the notches 55 when the tractor A is moved forwardly alongside of the suction nozzle carriage J.

The tractor is advanced until the mouth end 47 of the suction hood F is disposed directly above the cutter bar 15, as illustrated in Figure 10. The shoes 57 may be replaced at this time. Then the plates 62 and 63 are raised until they abut the walls 48 and 49, respectively, of the suction hood, as shown in Figure 4. At this time, the springs 65 are engaged with the plates 62—63 to draw them against the walls 48—49 of the hood F.

Summary of operation

The operation of my harvester for ladino clover seed is summarized briefly as follows:

Assuming that the suction nozzle carriage J has been assembled over the mower B and the lower end of the suction hood F, the tractor A is advanced so that the mower will cut a swath 14 of ladino clover C, as suggested in Figure 2. During the advance of the apparatus, the clover plants will be drawn upwardly by the suction established by the blower E in the hood F and nozzle J, presenting the plants to the cutting action of the guards 17 and sickle 19. The loose seed 35 and seed-containing blossoms 52 are drawn through the suction hood, pass through the tubular outlet end 43 of the hood, and enter into the blower itself. These seeds and blossoms are discharged from the outlet 33 directly into the trailer G.

The entire carriage J is free to move up and down relative to the hood F, when encountering uneven ground surface. Moreover, the outboard and inboard ends J1 and J2 of this suction nozzle carriage may rise or fall independently of one another, as suggested by the arrows b in Figures 3 and 6, depending upon the contour of the ground. Furthermore, the carriage J may rock about its longitudinal axis (see arrows a in Figures 4 and 5) so that the carriage can travel over field obstructions, for instance an irrigation ridge 53 shown in Figure 5. The arrows c in Figures 6 and 7 show the carriage as twisting horizontally about the lower end of the vertically-arranged suction hood, it being noted that the springs 65 will yield to permit this movement. Further, a slight endwise shifting of the carriage along its longitudinal axis is afforded by the resilient sealing members 66, as suggested by the arrows d in Figures 3 and 6. Of course, various combinations of the foregoing movements may take place at the same time. Thus the suction nozzle carriage J has limited universal movement relative to the suction hood F and the mower mechanism B.

The rubber tire H, which constitutes the support for the upper end of the hood F, will permit the mouth end 47 of the hood to move into various inclined positions with respect to horizontal. Also, this tire and the slots 46 in the rim 40 will allow the tubular outlet end 43 of the hood to turn slightly about the axis 42 of the hood outlet end. In the event that the mower B should swing rearwardly when striking an obstruction, the carriage J will swing therewith.

In passing over a field obstruction, such as an irrigation ridge 53, my apparatus will harvest the ladino blossoms growing on this ridge and slopes thereof, as well as clover disposed on level or other uneven ground. The tractor A is driven along a previously-cut swath 11. Accordingly, the tractor will not press the clover into the ground. The mower B reaches laterally into the uncut clover.

Actual field tests show that my harvester will recover substantially all of the ladino clover seed during a single "pass" over the field, with the seed free from dirt. In earlier types of machines, where the mower was mounted behind the tractor, about four "passes" were required over the entire field, much dirt was mixed with the seed, and considerable proportions of the seeds were lost. Although I have described my apparatus in connection with harvesting ladino clover, it may be employed for harvesting other crops, especially plants that grow close to the ground. The preambles of the annexed claims are sufficiently broad to cover other such crops.

I claim:

1. In a harvester for ladino clover seed, or the like: a mower mechanism supported by a traction device and the ground for movement over the ground to cut clover; a suction hood having an inlet mouth disposed above and adjacent to the mower mechanism; means for creating suction in the hood of sufficient magnitude to raise the clover upwardly into the mower mechanism; a suction nozzle carriage disposed to ride upon the ground, and mounted for limited universal movement relative to the suction hood and mower mechanism so that the carriage will continue to ride upon the ground while moving in response to uneven ground surface; this carriage surrounding the mouth end of the suction hood, and projecting therebelow to extend the suction downwardly toward the ground; and means mounting the hood for limited universal movement in any direction, whereby the hood may move in response to force exerted thereupon by the carriage.

2. In a harvester: a suction hood having a depending mouth inlet end; a mower mechanism supported by a traction device and the ground for movement over the ground and disposed beneath the inlet end of the hood; and a ground-supported suction nozzle carriage disposed to ride upon the ground, and having upright plates telescoped over the lower end of the hood in surrounding relation therewith; these plates projecting below the mouth end of the hood to extend the suction downwardly toward the ground; the carriage having limited universal movement in any direction relative to the hood and mower mechanism so that the carriage will continue to ride upon the ground while moving in response to uneven ground surface.

3. In a harvester: a suction hood having a depending mouth inlet end; a mower mechanism supported by a traction device and the ground for movement over the ground and disposed below the inlet end of this hood; the hood including front, rear and a pair of end walls joined together to provide a conduit; a suction nozzle carriage having supporting means therefor disposed to ride upon the ground; the carriage being removably telescoped over the lower end of the hood so as to be advanced over the ground thereby and therewith; the carriage projecting below the lower end of the hood to extend the suction downwardly toward the ground; the carriage having limited universal movement in any direction relative to the hood and mower mechanism so that the carriage will continue to ride upon the ground while moving in response to uneven ground surface; the carriage including: upright end plates disposed adjacent to and exteriorly of the end walls of the hood for up and down movement relative thereto; substantially upright front and rear plates hinged to the end plates, and arranged exteriorly of and abutting the front and rear walls, respectively, of the hood for up and down movement relative thereto; and means retaining the front and rear carriage plates in abutting relation with the hood walls during the limited universal movement of the carriage.

4. In a harvester: a suction hood having a depending mouth inlet end; a mower mechanism supported by a traction device and the ground for movement over the ground and disposed below the inlet end of this hood; the hood including front, rear and a pair of end walls joined together to provide a conduit; a suction nozzle carriage having supporting means therefor disposed to ride upon the ground; the carriage being removably telescoped over the lower end of the hood so as to be advanced over the ground thereby and therewith; the carriage projecting below the lower end of the hood to extend the suction downwardly toward the ground; the carriage having limited universal movement in any direction relative to the hood and mower mechanism so that the carriage will continue to ride upon the ground while moving in response to uneven ground surface; the carriage including: upright end plates disposed adjacent to and exteriorly of the end walls of the hood for up and down movement relative thereto; substantially upright front and rear plates hinged to the end plates, and arranged exteriorly of and abutting the front and rear walls, respectively, of the hood for up and down movement relative thereto; and springs interconnecting the upper ends of the front and rear plates of the carriage to yieldingly draw them against the front and rear walls, respectively, of the hood.

5. In a harvester: a suction hood having a depending mouth inlet end; a mower mechanism supported by a traction device and the ground for movement over the ground and disposed below the inlet end of this hood; the hood including front, rear and a pair of end walls joined together to provide a conduit; a suction nozzle carriage having supporting means therefor disposed to ride upon the ground; the carriage being removably telescoped over the lower end of the hood so as to be advanced over the ground thereby and therewith; the carriage projecting below the lower end of the hood to extend the suction downwardly toward the ground; the carriage having limited universal movement in any direction relative to the hood and mower mechanism so that the carriage will continue to ride upon the ground while moving in response to uneven ground surface; the carriage including: upright end plates disposed adjacent to and exteriorly of the end walls of the hood for up and down movement relative thereto; substantially upright front and rear plates hinged to the end plates, and arranged exteriorly of and abutting the front and rear walls, respectively, of the hood for up and down movement relative thereto; and springs interconnecting the upper ends of the front and rear plates of the carriage to yieldingly draw them against the front and rear walls, respectively, of the hood; the hinges between the front and rear plates of the carriage and the end plates of the latter being disposed below the lowermost end of the hood; these front and rear plates being swingable on their respective hinges into lowered positions when the springs are disengaged so that the hood can be moved horizontally thereover, without encountering obstruction by the lowered plates.

6. In a harvester: a suction hood having a depending mouth inlet end; a mower mechanism supported by a traction device and the ground for movement over the ground and disposed below the inlet end of this hood; the hood including front, rear and a pair of end walls joined together to provide a conduit; a suction nozzle carriage having supporting means therefor disposed to ride upon the ground; the carriage being removably telescoped over the lower end of the hood so as to be advanced over the ground thereby and therewith; the carriage projecting below the lower end of the hood to extend the suction downwardly toward the ground; the carriage having limited universal movement in any direction relative to the hood and mower mechanism so that the carriage will continue to ride upon the ground while moving in response to uneven ground surface; the carriage including: upright end plates disposed adjacent to and exteriorly of the end walls of the hood for up and down movement relative thereto; substantially upright front and rear plates hinged to the end plates, and arranged exteriorly of and abutting the front and rear walls, respectively, of the hood for up and down movement relative thereto; and means retaining the front and rear carriage plates in abutting relation with the hood walls during the limited universal movement of the carriage; the end plates of the carriage having underneath edges curving upwardly and forwardly to constitute runners for lifting the carriage upwardly over obstructions.

7. In a harvester: a suction hood having a depending mouth inlet end; this hood having front, rear and end walls joined together to provide a conduit; and a suction nozzle carriage removably telescoped over the lower inlet end of the hood, and projecting therebelow to extend the suction downwardly toward the ground; the carriage including: a pair of substantially upright end plates arranged beyond the end walls of the hood, and having supporting means for the end plates riding over the ground; at least one of these end plates having a notch in the lower end thereof through which a sickle bar of a combined tractor and ground-supported mower mechanism may be inserted to extend between the end plates; this notch being disposed below the hood inlet end so that the sickle bar will be arranged below the mouth end of the hood; and front and rear plates on the carriage bearing against the front and rear hood walls, respectively; the notch extending to the rearmost edge of the plate in which it is formed, and being dimensioned and positioned so that the sickle bar may be driven forwardly over the ground into the notch.

8. In a harvester, a suction nozzle carriage including: a pair of spaced-apart substantially upright end plates having supporting means therefor riding on the ground; front and rear spaced-apart plates extending transversely between these end plates, and normally being arranged in substantially upright position; hinges swingably securing the lower ends of the front and rear plates to the end plates; these front and rear plates being swingable in opposite directions into substantially horizontal positions; and detachable springs interconnecting the upper ends of the front and rear plates adapted to yieldingly draw them against an interposed suction hood.

9. In a harvester: a suction hood having a depending mouth inlet end; the hood having front, rear and a pair of end walls joined together to provide a conduit; a suction nozzle carriage having supporting means therefor disposed to ride upon the ground, and mounted for limited universal movement relative to the hood so that the carriage will continue to ride upon the ground while moving in response to uneven ground surface; this carriage surrounding the mouth end of the hood, and projecting therebelow to extend the suction downwardly toward the ground; the carriage including: substantially upright end plates disposed beyond the end walls of the hood; sealing means interposed between the end plates and these end walls of the hood to minimize passage of air therebetween during the limited universal movement of the carriage; substantially upright front and rear plates abutting the front and rear walls, respectively, of the hood; and yielding means interconnecting the front and rear carriage plates to draw them against the front and rear walls, respectively, of the hood.

JACK R. BRINKLEY.

REFERENCES CITED

The following references are of record in the file of this patent:

UNITED STATES PATENTS

| Number | Name | Date |
|---|---|---|
| 1,045,667 | Blood | Nov. 26, 1912 |
| 1,122,375 | Engle | Dec. 29, 1914 |
| 1,134,443 | Engle | Apr. 6, 1915 |
| 1,331,710 | Isom | Feb. 24, 1920 |
| 1,347,733 | Davis | July 27, 1920 |
| 1,978,718 | Paradise | Oct. 30, 1934 |
| 2,256,219 | Ronning | Sept. 16, 1941 |
| 2,330,727 | May | Sept. 28, 1943 |
| 2,455,196 | Simpson | Nov. 30, 1948 |

FOREIGN PATENTS

| Number | Country | Date |
|---|---|---|
| 22,035 | Norway | Feb. 19, 1912 |
| 23,328 | Australia | Nov. 1, 1949 |